July 16, 1940.  F. P. HEALY  2,207,861
BORING BAR GUIDING MECHANISM
Filed July 22, 1938
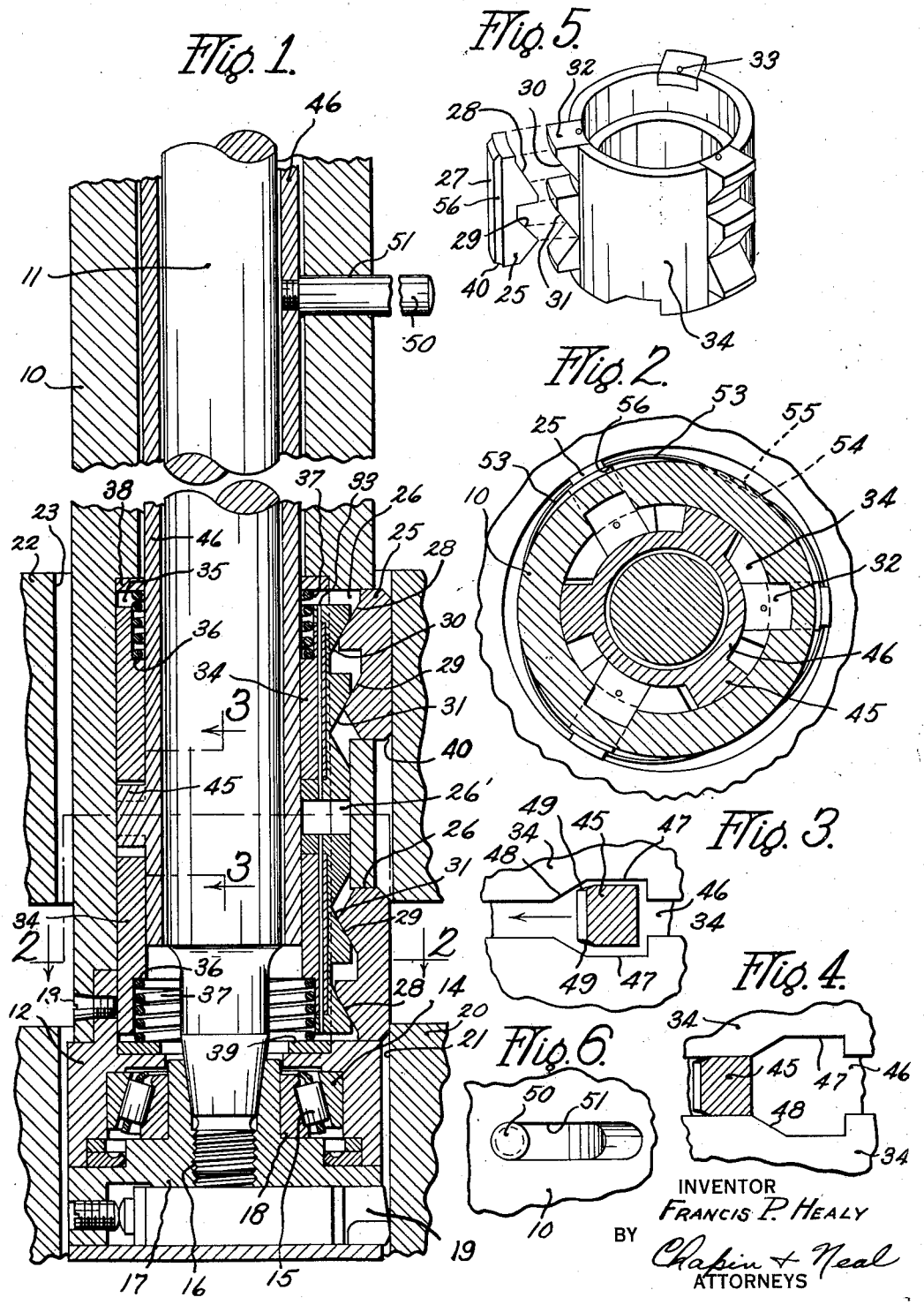
INVENTOR
FRANCIS P. HEALY
BY
Chapin + Neal
ATTORNEYS Patented July 16, 1940

2,207,861

UNITED STATES PATENT OFFICE 2,207,861

BORING BAR GUIDING MECHANISM

Francis P. Healy, Springfield, Mass., assignor to Van Norman Machine Tool Company, Springfield, Mass., a corporation of Massachusetts Application July 22, 1938, Serial No. 220,601

5 Claims. (Cl. 77—4)

My invention relates to boring heads for boring the cylinders of internal combustion engines or the like, and more particularly it relates to a guiding mechanism for guiding the boring head.

It has been proposed to guide a boring head during the initial part of the boring operation from a stationary guide positioned above the work piece and after the head has advanced a sufficient distance into the work, to guide the head by means of follow guides acting against the freshly cut bore. Guides of this character have had the fault that the change of control from the stationary guide to the follow guides has been accompanied by a blemish in the bore due to the change in the guiding conditions.

It is the object of my invention to provide a guiding mechanism which will maintain a more uniform guiding condition throughout the boring operation than is possible with the guiding mechanisms heretofore available.

In the accompanying drawing, which illustrates one embodiment of my invention,

Fig. 1 is a vertical sectional view of a boring bar, equipped with guiding mechanism in accordance with my invention;

Fig. 2 is a sectional view substantially on line 2—2 of Fig. 1;

Fig. 3 is a sectional detail view substantially on line 3—3 of Fig. 1;

Fig. 4 is a view similar to Fig. 3 but with the parts in a different position;

Fig. 5 is a perspective view of the wedge members of the follow guide; and

Fig. 6 is a detail view looking from the right of Fig. 1 showing the slot in which the control handle operates.

Referring to the drawing, 10 designates a sleeve in which the cutter shaft 11 is rotatably mounted. The lower end of the sleeve 10 is provided with a bearing head 12 secured to the sleeve by screws 13 in which is mounted one bearing member 14 of a roller bearing 15. The lower end of shaft 11 has secured thereto at 16 a cutter head 17 provided with a bearing member 18 forming the second member of the roller bearing 15. Head 17 carries a cutting tool 19 which may take any desired form. The form shown is of a type known as a fly cutter. The sleeve 10 and its associated parts are non-rotatably mounted in a boring machine, not shown, having means to constantly rotate shaft 11 while advancing the bar as a whole toward the work piece, all in the usual manner.

The work piece is indicated at 20 and in Fig. 1 the cutter is shown advanced partway into a bore 21 in the work. At 22 is shown an outside guide which is formed with a cylindrical opening 23 of approximately the diameter of the bore 21. Guide 22 is secured by any suitable means not shown in coaxial alignment with the bore 21 in the work piece 20.

Various modes of guiding the cutter from an outside guide have previously been suggested. Ordinary boring bars frequently have an outside bearing in which the rotating boring bar bears directly. In this construction the distance from the bearing increases as the boring proceeds, and the flexibility of the bar and the looseness of its fit in the outside bearing cause progressively increasing errors in the diameter of the bored hole. In certain prior applications I have suggested guiding the sleeve 10 directly from the outside and supplementing this guidance during the boring by follow guides carried by the sleeve and contacting with the freshly cut bore. Since the two forms of guidance were not on the same sleeve-borne part the accuracy depended upon how closely coaxial the sleeve and the follow guide could be made. To a lesser extent this method exhibited the progressive increase of error noted in the first case up to the point where the follow guide contacted the freshly cut bore; and produced a bored cylinder which in its first and last parts differed, for very fine work, slightly in dimensions and characteristics. In certain prior applications I have also suggested that the non-rotatable sleeve 10 be provided with follow guides which passed from an outside guide into the cylinder, thus starting the bore with firm guidance from the outside guide and continuing it with guidance secured from the freshly cut bore itself. This eliminated the error between the follow guide and the sleeve, since all the guiding was accomplished from the follow guide; but a blemish was introduced into the cylinder during the passage of the follow guide from the outside guiding ring into the freshly cut bore, the follow guide not being adequately guided from either source during the transition. It should be understood that the blemishes and inaccuracies referred to would be imperceptible in ordinary work, being on the order of one or more ten-thousandths of an inch; and are important only in the field of precision boring to which my invention relates.

In accordance with the present invention two axially separated follow guides are used, so positioned that when the leading one is in the transition stage the other is in full guiding contact with the outside guiding member. By this means it is possible to make a transition in which substantially no rigidity of the bar is lost, and in which the coaxiality of the guiding surfaces is preserved at all times. Thus the initial part of the bore is cut with the cutter guided by the first and then by both follow guides from the external guide ring. The bore is therefore preserved coaxial with the guide ring; and as guiding is later taken over by the freshly cut bore, acting through the leading follow guide, this coaxiality is preserved.

Referring to Figs. 1 and 5, each follow guide unit comprises in its preferred form a plurality of blocks 25 mounted for radial sliding movement in openings 26 formed in the sleeve 10. Blocks 25 have bore engaging faces 27 and are provided on their rear faces with spaced wedge surfaces 28 and 29 which respectively engage complementary wedge surfaces 30 and 31 formed on members 32 pinned as at 33 to a cylindrical member 34. The member 34 of each unit is mounted for axial sliding movement in an enlargement 35 of the bore of sleeve 10, members 32 extending radially into the openings 26 for operative engagement with the wedge surfaces of blocks 25. The upper end of member 34 of the upper unit and the lower end of member 34 of the lower unit are counter-bored as at 36 to receive compression springs 37 seating against the bases of the counter-bores. The upper end of the upper spring rests against a thrust washer 38 set in the upper end of enlargement 35 and the lower end of the lower spring rests against a thrust washer 39 set in the upper surface of member 12. The action of the springs is to urge the two members toward each other and move the blocks 25 radially outwardly by the thrust of wedge faces 30 and 31 on the wedge faces 28 and 29 respectively. The effective angle of inclination from the vertical (half the apex angle) of the mating wedge surfaces is below that at which the wedges become self locking for normal cutting stresses and above that at which the wedge becomes self locking for the pressure exerted upon the members 25 when the latter enter a restricted bore. Thus the members 25 will be moved outwardly by springs 37 and will maintain their position against the resistance of the metal to the cutting tool but will yield inwardly against the thrust exerted as the blocks enter the bore 21 if the latter is smaller than the bore 23 of the outside guide 22. The ends of the blocks 25 are beveled as at 40 to facilitate the entrance of the blocks into the smaller bore. In practice the difference in the diameters of the bores of the stationary guide and the work piece will be very slight (generally not more than a few thousandths of an inch) and this difference as well as the bevel 40 has been exaggerated in the drawing for the sake of clearness. The blocks 25 would similarly yield should they encounter a sudden restriction in the bore such as might be caused by the breaking off of the cutting point of the tool 19.

The mathematics of the angular relationship of the wedge faces are fully set forth in my prior application Serial No. 172,880 filed November 5, 1937, and need not be repeated here. In practice an apex angle of 60° and a spring pressure of twenty-seven pounds has proved satisfactory for ordinary conditions.

The members 34 are adapted to be separated against the action of springs 37 to permit free inward movement of the block 25 by circumferentially spaced cam lugs 45 extending radially from a sleeve 46 mounted for a limited rotation between shaft 11 and sleeve 10. Lugs 45 are positioned between members 34 and as best shown in Figs. 3, 4, and 5, the adjacent ends of the members 34 are provided with opposed lug receiving recesses 47. The recesses 47 are of sufficient depth so that when lugs 45 are located therein as shown in Fig. 3, the members 34 are permitted a sufficiently near approach to each other under the action of springs 36 to expand blocks 25 outwardly to the desired limit or until an obstruction such as the wall 23 of guide 22 or the wall of bore 21 is encountered. The recesses 47 are cut away at one side to form inclined cam surfaces 48 and the corresponding corners of lugs 45 are bevelled as at 49. The members 34 are held against rotation by the engagement of members 32 spline fashion in the openings 26 and connecting groove 26' and when sleeve 46 is rotated in the direction of the arrow in Fig. 3 the members 34 are wedged apart, as shown in Fig. 4, against the action of springs 36 thus permitting inward collapse of the blocks 25. Sleeve 46 is adapted to be rotated by means of a handle 50 extending outwardly through a slot 51 in sleeve 10, the extent of rotation of the sleeve being limited by engagement of the handle with the ends of the slot as shown in Fig. 6.

Inward movement of blocks 25, upon their release from the action of springs 36 by lugs 45, is assured by leaf springs 53 secured intermediate their ends in recesses 54, formed in the outer surface of sleeve 10, as by screws 55. The free ends of springs 53 engage against shoulders 56 formed on blocks 25 and tend to move the latter inwardly in openings 26 and to retain them in the openings.

From the above description it will be seen that when lugs 45 are in the recesses 47 each member 34 is free to move independently of the other and with the set of follow blocks 25 associated therewith, comprise two spaced follow guides. The spacing of stationary guide 22 from the work piece is such in relation to the spacing between the two follow guides, that the upper follow guide will be in complete engagement with the stationary guide during the passage of the lower follow guide from the stationary guide into the freshly cut bore in the work piece. Thus during the movement of the lower follow guide across the space separating the fixed guide from the work piece, the upper follow guide continues to steadily guide the cutter head, unaffected by the movements of the blocks 25 of the lower guide as they adjust themselves to the freshly cut bore 21. By the time the upper follow guide leaves the fixed guide 22 the lower guide is completely in the freshly cut bore in the work piece, and continues to guide the cutter unaffected by any irregularity of movement of upper follow guide as it leaves the fixed guide and enters the bore in the work piece.

I claim:

1. A boring head comprising a reciprocable, non-rotatable sleeve, a shaft rotatable therein, a cutter head journaled in the sleeve and coupled to the shaft, a stationary guide mounted adjacent the work piece with its axis coincident with that of the bore to be cut, two circumferential series of guiding members spaced axially one from another to the rear of the cutter sufficiently to permit one to be in guiding engagement with the stationary guide while the other is passing into the freshly cut bore, said members being mounted for radial movement in the sleeve and having their outer surfaces coaxial with the axis of the cutter head, separate annular members mounted between the shaft and the sleeve, each having wedge contact with all the members of one series, and yielding means positioned to cause independent movement of each of said annular members in a direction to cause expansion of the associated series of guiding members.

2. A boring head comprising a reciprocable, non-rotatable sleeve, a shaft rotatable therein, a cutter head journaled in the sleeve and coupled to the shaft, a stationary guide mounted adjacent the work piece with its axis coincident with that of the bore to be cut, two circumferential series of guiding members spaced axially one from another to the rear of the cutter sufficiently to permit one to be in guiding engagement with the stationary guide while the other is passing into the freshly cut bore, said members being mounted for radial movement in the sleeve and having their outer surfaces coaxial with the axis of the cutter head, separate annular members mounted between the shaft and the sleeve, each having wedge contact with all the members of one series, the effective angle of said wedge means being below that at which the wedge becomes self-locking for normal guiding stresses, and above that at which the wedge becomes self-locking for the pressure exerted upon the follow guide by the follow guide entering a constricted portion of the bore, and yielding means positioned to cause independent movement of each of said annular members in a direction to cause expansion of the associated series of guiding members.

3. A boring device comprising a stationary guide mounted coaxially with the work piece to be bored and having an inner guiding surface, a reciprocable member, a boring cutter rotatably carried by the reciprocable member, a pair of follow guides mounted in the reciprocable member wholly to the rear of the cutter for axial sliding contact with the freshly cut bore, said follow guides being axially spaced one from the other a sufficient distance to permit one to be wholly in guiding engagement with the stationary guide while the other is passing into contact with the freshly cut bore, and a mechanism individual to each of the two follow guides to hold them independently in guiding contact with said stationary guide and said freshly cut bore.

4. A boring device comprising a stationary guide mounted coaxially with the work piece to be bored and having an inner guiding surface, a reciprocable member, a boring cutter carried thereby and rotatably mounted therein, a pair of follow guides mounted in the reciprocable member wholly to the rear of the cutter for axial sliding contact with the freshly cut bore, each follow guide comprising a circumferential series of guiding members radially movable in said reciprocable member, said follow guides being axially spaced one from the other a sufficient distance to permit one to be wholly in guiding engagement with the stationary guide while the other is passing into contact with the freshly cut bore, wedge means individual to each follow guide for holding its guiding members in guiding contact with an enclosing surface, and yielding means for causing expanding movement of the wedge means.

5. A boring device comprising a stationary guide mounted coaxially with the work piece to be bored and having a cylindrical inner surface, a reciprocable member, a boring cutter carried thereby and rotatably mounted therein, a pair of follow-guides mounted in the reciprocable member wholly to the rear of the cutter and each comprising a circumferential series of guide members extending radially in the reciprocable member into position to contact an enclosing surface for axial sliding contact therewith, a pair of independently movable members each having wedge contact with all the guide members of one series, the effective angle of said wedge means being below that at which the wedge becomes self-locking for normal guiding stresses and above that at which the wedge becomes self-locking for the contractive pressure exerted on the series of guide members upon entering a constricted portion of the bore, and yielding means operative on said independently movable members in a direction to cause expansion of the associated series of guide members.

FRANCIS P. HEALY.